United States Patent
Kitchell et al.

(10) Patent No.: US 7,210,641 B2
(45) Date of Patent: May 1, 2007

(54) METHODS OF MAKING A NIOBIUM METAL OXIDE

(75) Inventors: Ricky W. Kitchell, Douglassville, PA (US); Heather L. Wolbach, Bethlehem, PA (US)

(73) Assignee: Cabot Corporation, Boston, MA (US)

( * ) Notice: Subject to any disclaimer, the term of this patent is extended or adjusted under 35 U.S.C. 154(b) by 433 days.

(21) Appl. No.: 10/083,657

(22) Filed: Feb. 25, 2002

(65) Prior Publication Data

US 2003/0057304 A1 Mar. 27, 2003

Related U.S. Application Data

(60) Provisional application No. 60/271,983, filed on Feb. 28, 2001.

(51) Int. Cl.
*B02C 19/00* (2006.01)

(52) U.S. Cl. ............. 241/21; 241/29; 423/594.17

(58) Field of Classification Search .......... 241/172, 241/171, 184, 30, 21, 29, 72, 153; 423/594.17
See application file for complete search history.

(56) References Cited

U.S. PATENT DOCUMENTS

| | | | | |
|---|---|---|---|---|
| 1,125,921 A | * | 1/1915 | Atkins | 241/153 |
| 4,205,964 A | * | 6/1980 | Hill | 51/309 |
| 4,643,365 A | * | 2/1987 | McKim | 241/101.2 |
| 4,887,773 A | * | 12/1989 | Mehltretter | 241/171 |
| 6,322,912 B1 | | 11/2001 | Fife | 428/702 |
| 6,373,685 B1 | | 4/2002 | Kimmel et al. | 361/508 |
| 6,391,275 B1 | | 5/2002 | Fife | 423/592 |
| 6,402,066 B1 | | 6/2002 | Habecker et al. | 241/21 |
| 6,416,730 B1 | | 7/2002 | Fife | 423/592 |
| 6,706,240 B2 | * | 3/2004 | Habecker et al. | 419/33 |
| 2005/0025699 A1 | * | 2/2005 | Reed et al. | 423/594.17 |

FOREIGN PATENT DOCUMENTS

| | | | |
|---|---|---|---|
| GB | 2134816 A | * | 8/1984 |
| WO | WO 00/15555 | | 3/2000 |
| WO | WO 00/15556 | | 3/2000 |
| WO | WO 00/56486 | | 9/2000 |
| WO | WO 01/96620 A2 | | 12/2001 |
| WO | WO 02/068333 A2 | | 9/2002 |

OTHER PUBLICATIONS

International Search Report for PCT US 02/05954.
U.S. Appl. No. 09/154,452.
U.S. Appl. No. 09/347,990.
U.S. Appl. No. 09/533,430.
U.S. Appl. No. 09/758,705.
U.S. Appl. No. 09/816,689.

* cited by examiner

*Primary Examiner*—Mark Rosenbaum

(57) ABSTRACT

Methods to at least partially reduce a niobium oxide are described. In one embodiment, a milling process is described wherein the surfaces of the mill in contact with the starting metal oxide, getter material, and/or oxygen reduced metal oxide are the same as the material being milled. Other milling techniques and products are also described.

17 Claims, 2 Drawing Sheets

Staged Milling - Starting with 20 Mesh Feed

METHODS OF MAKING A NIOBIUM METAL OXIDE

This application claims the benefit under 35 U.S.C. § 119(e) of prior U.S. Provisional Patent Application No. 60/271,983 filed Feb. 28, 2001, which is incorporated in its entirety by reference herein.

BACKGROUND OF THE INVENTION

The present invention relates to niobium and oxides thereof and more particularly relates to niobium oxides and methods to minimize contamination when making at least partially reduced niobium oxide and oxygen reduced niobium.

With the ever-increasing demand for capacitor materials such as tantalum, alternatives to tantalum have become an important priority in order to meet industry demands. Niobium is becoming one of the alternatives to tantalum but, as the industry has realized, niobium is not a complete substitute for tantalum due to niobium not providing the same electrical properties. Accordingly, further developments in the niobium area continue today.

Another alternative to tantalum is niobium metal oxides that have been oxygen reduced, in other words, niobium suboxides such as NbO and the like. The oxygen reduced niobium oxides show considerable promise as providing an additional material that can be used in the formation of capacitor anodes. In order to further satisfy industry demands, several properties of the oxygen reduced niobium oxides should preferably be improved such as the crush strength of the oxygen reduced niobium oxides, as well as efforts to reduce the amounts of contamination that occurs in the manufacturing of the oxygen reduced niobium oxides. In addition, acid leaching is commonly used to reduce the level of contamination occurring when niobium is milled to achieve particular particle sizes. This acid leaching complicates the manufacturing process and adds to additional costs to the manufacturing process.

In addition, the flow property of the oxygen reduced niobium oxides could be further improved to better satisfy industry standards.

Accordingly, there is a need to overcome one or more of the above-described disadvantages.

SUMMARY OF THE PRESENT INVENTION

A feature of the present invention is to provide oxygen reduced niobium oxides that have improved crush strength.

Another feature of the present invention is to provide a method to make oxygen reduced niobium oxides that preferably avoid the step of acid leaching.

A further feature of the present invention is to provide methods of making oxygen reduced niobium oxides that avoid mixing getter material with a starting niobium oxide in dry form.

Furthermore, an additional feature of the present invention is to provide a method of making oxygen reduced niobium oxides such that the getter material and the starting niobium oxide are relatively close with respect to the particle distribution of each component.

Another feature of the present invention is to provide a method for permitting a more uniform milling of the getter material, the starting niobium oxide, and/or the final product.

Another feature of the present invention is to use at least one milling step/stage to reduce the size of the getter material and the starting niobium oxide.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description and appended claims.

To achieve these objectives and other advantages, and in accordance with the purposes of the present invention as embodied and broadly described herein, the present invention relates to a method to at least partially reduce a niobium oxide. This method includes the steps of milling a getter material, starting niobium oxide, and/or oxygen reduced niobium oxide in a mill, wherein the surfaces of the mill in contact with the getter material and/or starting niobium oxide and/or oxygen reduced niobium oxide are niobium metal, an oxide thereof, an alloy thereof, or a doped niobium.

In addition, the present invention relates to a method to at least partially reduce a niobium oxide. This method includes the steps of milling a starting niobium oxide, a getter material, or both, wherein the milling involves sequential milling. In particular, the milling, using the milling media, such as the milling balls, has at least two milling stages wherein in the first stage the diameter of the milling media is larger than the diameter of the milling media used in the second stage of milling, and so on. This variation in the diameter of the milling media results in faster milling times to achieve the targeted particle size of the getter material, starting niobium oxide, oxygen reduced niobium oxide, or combinations thereof. Furthermore, this stage milling results in a narrower particle distribution range which is beneficial with respect to a variety of properties including electrical properties of a capacitor made from such materials.

The present invention also relates to niobium getter material, starting niobium oxide, or the oxygen reduced niobium oxide or any combination thereof having a narrow particle distribution range. Preferably the particle distribution range is in a range wherein the D10 and/or D90 is within 25% of the D50 and more preferably within 20% of the D50 and more preferably within 10% of the D50 of the getter material, starting niobium oxide, and/or oxygen reduced niobium oxide.

The present invention further relates to a method to at least partially reduce a niobium oxide which includes the step of wet milling the getter material and the starting niobium oxide separately in a mill. This process achieves a more uniform particle distribution for each individual component such that when the two components are combined, the particle distribution is relatively the same.

The present invention also relates to wet milling the getter material and the starting niobium oxide together, which also achieves the above-described advantages.

The present invention also relates to milling (wet or dry) the oxygen reduced niobium oxide once formed.

The present invention also relates to an oxygen reduced niobium oxide having excellent crush strength, good flowability, low leakage, and/or low impurities.

The present invention further relates to a method to at least partially reduce a niobium oxide, which avoids an acid leaching process.

The present invention further relates to capacitor anodes containing the niobium oxides of the present invention and having other beneficial properties.

It is to be understood that both the foregoing general description and the following detailed description are exemplary and explanatory only and are intended to provide further explanation of the present invention, as claimed.

DETAILED DESCRIPTION OF THE PRESENT INVENTION

Figure 1:
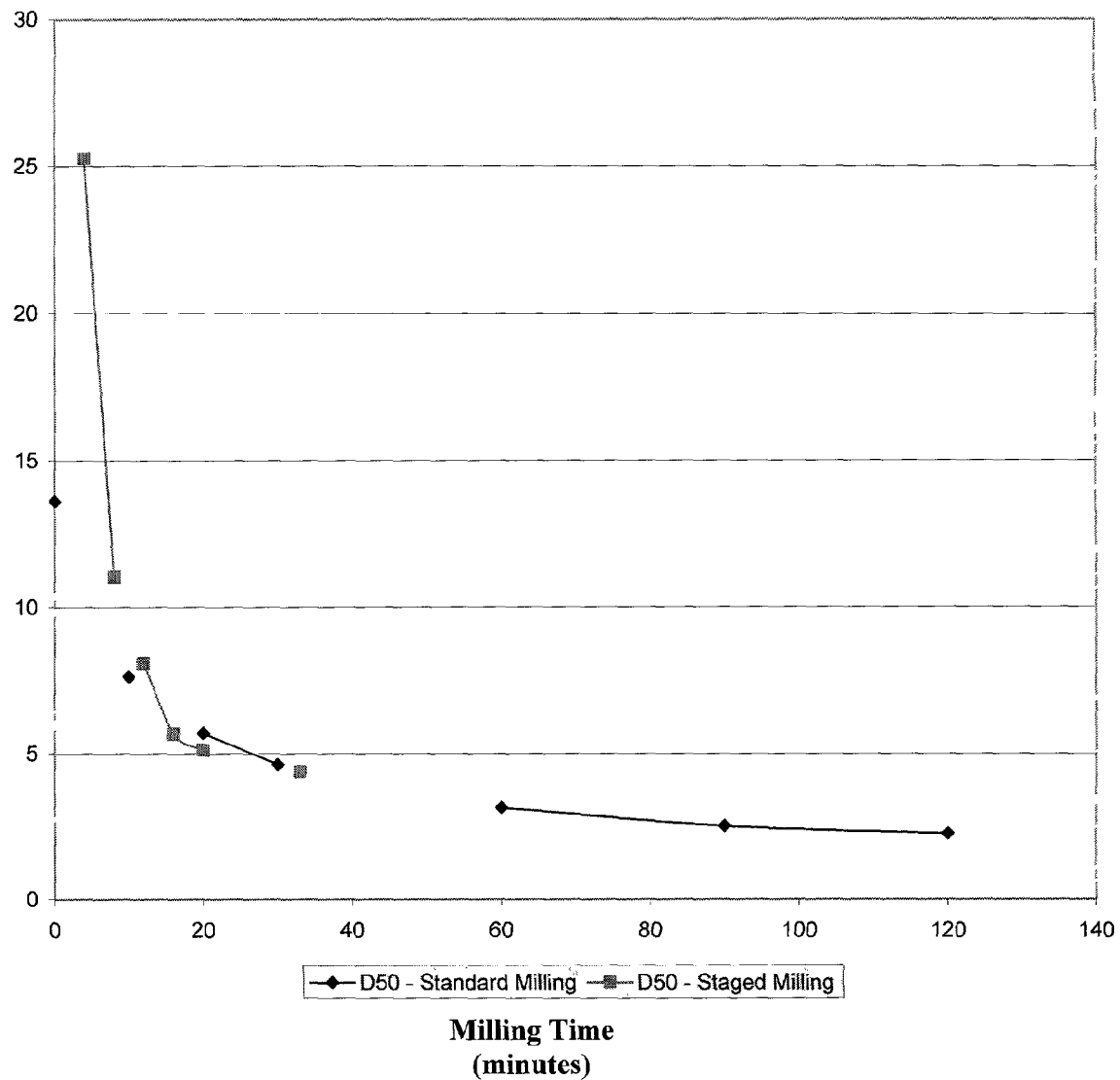
FIGS. 1 and 2 are graphs plotting time vs. particle size for NbO samples using staged milling.

The present invention relates to various steps that can be incorporated into a method to make oxygen reduced niobium oxides or other oxygen reduced metal oxides. In general, the present invention can include reducing the particle size of the starting niobium metal oxide, the getter material, or the oxygen reduced niobium oxide by various milling techniques. In one milling technique, one or more of the above-described materials can be milled wherein all of the surfaces that come in contact with the getter material, oxygen reduced niobium oxide, and/or the starting niobium oxide are niobium, an alloy thereof, an oxide thereof, a nitride thereof, or doped niobium (e.g., doped with nitrogen, oxygen, sulfur, phosphorus, boron, yittrium, and the like). When the material is a metal different from niobium, that metal (or an alloy thereof, a nitride thereof, or a doped metal) can be used on the contact surfaces of the various components of the mill.

Another milling step that can be used alone or in combination with the above step involves staged milling. In staged milling, there are at least two stages of milling wherein in the first stage, the diameter of the milling media is larger than the diameter of the milling media used in the second and subsequent stages of milling. This staged milling leads to a variety of beneficial properties including a narrower particle distribution range of the finished material, whether that material is a getter material, starting niobium oxide, and/or a finished oxygen reduced niobium oxide. In addition, the stage milling leads to faster milling times to achieve the targeted particle size of the getter material, starting niobium oxide, and/or finished oxygen reduced niobium oxide.

Any preliminary or intermediate or final milling step can be used in addition to the milling steps described herein. For example, a jet milling can be used at any point.

The starting niobium oxide used in the present invention can be in any shape or size. Preferably, the niobium oxide is in the form of a powder or a plurality of particles. Examples of the type of powder that can be used include, but are not limited to, flaked, angular, nodular, and mixtures or variations thereof. Preferably, the niobium oxide is in the form of a powder, which more effectively leads to the oxygen reduced niobium oxide. Examples of such preferred starting niobium oxide powders include those having mesh sizes of from about 60/100 to about 100/325 mesh and from about 60/100 to about 200/325 mesh. Another range of size is from −40 mesh to about −325 mesh.

The getter material for purposes of the present invention is any material capable of reducing the starting metal oxide to the oxygen reduced metal oxide. Preferably, the getter material is any material capable of reducing the starting niobium oxide to the oxygen reduced niobium oxide. Preferably, the getter material is niobium. Other metal or non-metal containing getter materials can be used alone or in addition. The niobium getter material for purposes of the present invention is any material containing niobium metal, which can remove or reduce at least partially the oxygen in the niobium oxide. Thus, the niobium getter material can be an alloy or a material containing mixtures of niobium metal with other ingredients. Preferably, the niobium getter material is predominantly, if not exclusively, niobium metal. It is preferred that high purity niobium metal comprises the getter material to avoid the introduction of other impurities during the heat-treating process. Accordingly, the niobium metal in the niobium getter material preferably has a purity of at least about 98% and more preferably at least about 99%. Further, it is preferred that impurities such as oxygen are not present or are present in amounts below about 100 ppm. In the preferred embodiment, the niobium getter material becomes part of the final product, namely the oxygen reduced niobium oxide(s).

The getter material can be in any shape or size. For instance, the getter material can be in the form of a tray, which contains the niobium oxide to be reduced, or can be in a particle or powder size. Preferably, the getter materials are in the form of a powder in order to have the most efficient surface area for reducing the niobium oxide. The getter material, thus, can be flaked, angular, nodular, and mixtures or variations thereof.

In general, the materials, processes, and various operating parameters as described in U.S. patent application Ser. No. 09/154,452 filed Sep. 16, 1998; Ser. No. 09/347,990 filed Jul. 6, 1999; Ser. No. 09/396,615 filed Sep. 15, 1999; and Ser. No. 09/533,430 filed Mar. 23, 2000; and U.S. Provisional Patent Application Nos. 60/100,629 filed Sep. 16, 1998; 60/229,668 filed Sep. 1, 2000; and 60/246,042 filed Nov. 6, 2000 can be used in the present invention and all of these applications are incorporated herein in their entirety.

In making the niobium oxides of the present invention, and preferably NbO or variations thereof, hydrogen gas (or other carrier gases) is preferably used as the carrier wherein oxygen is transferred from the starting niobium material, namely $Nb_2O_5$ to Nb with the use of the $H_2$ gas as the carrier. The preferred reaction scheme is as follows:

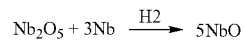

$$Nb_2O_5 + 3Nb \xrightarrow{H_2} 5NbO$$

As can be seen, by using a niobium metal as the getter material, the getter material along with the starting niobium oxide can result into the final product, which is preferably NbO. In more detail, there are typically two processes involved in preparing the niobium suboxides of the present invention. One process involves the preparation of the getter material and the other part of the process involves the use of the getter material along with the starting niobium oxide to form the niobium suboxide of the present invention. In preparing the getter material, which is preferably niobium powder, a niobium ingot is subjected to a hydriding process in order to embrittle the niobium metal for purposes of crushing the ingot into powder, which is subsequently subjected to a screen in order to obtain a uniform particle distribution, which is preferably from about 5 to about 300 microns in size. If needed, the powder can be subjected two or more times to the crusher in order to achieve the desired uniform particle distribution. Afterwards, the powder is then preferably subjected to milling in order to obtain the desired particle size, which is from about 1 to about 5 microns in size.

In this process, the milling of the niobium metal in order to form the niobium getter powder preferably occurs in a mill wherein all of the surfaces that come in contact with the niobium getter material are niobium. In other words, preferably all of the contact surfaces of the mill, arms, and grinding media used in the mill have a niobium surface. The niobium surface on the contact areas of the mill and grinding media can be accomplished by coating the grinding media and internal surfaces of the mill with niobium metal or plates of niobium metal can be placed (e.g., welded) in the mill. The grinding media, such as balls, can be coated with niobium or can be completely made of niobium. By having all contact surfaces of the mill and grinding media made of niobium, the amount of contamination to the niobium getter material is significantly reduced, and preferably reduced to such a level that acid leaching is not necessary and is preferably avoided. This is especially advantageous since acid leaching can be inconsistent and lead to varying levels of contamination from lot to lot.

Preferably, the amount of niobium present on the contact surfaces of the mill and grinding media is of a sufficient level such that during the milling process, none of the non-niobium underlying surfaces come in contact with the niobium getter material. Preferable, the thickness (e.g., about 1 mm or less to about 100 mm or more) of the niobium on the contact surfaces of the mill and grinding media is sufficient such that repeated milling can occur from lot to lot. Preferably, the milling of the niobium getter powder occurs in a wet mill, which leads to a more uniform particle distribution size of the getter material. In wet milling, the liquid used can be aqueous or non-aqueous, such as water, alcohol, and the like. Preferably, the milling is sufficient to reduce the size to a range of from about 1 to about 10 microns, and more preferably, from about 1 micron to about 5 microns.

Similarly, in the present invention, the starting niobium oxide can be subjected to milling, e.g., wet milling, in order to achieve a more uniform particle distribution. Typically, the milling time required to achieve a similar particle distribution size of the starting niobium oxide as compared to the niobium getter material requires less time. Preferably, the milling, and more preferably, the wet milling of the starting niobium oxide occurs in a similar milling set-up used with respect to the niobium getter powder. In other words, preferably, the contact surfaces of the mill, arms, and grinding media are preferably niobium metal to again avoid contamination of the starting niobium oxide. Preferably, the milling is sufficient to reduce the size of the starting niobium oxide to a size substantially similar to the getter material. In one sense, the starting niobium oxide is de-agglomerated by the milling.

In a preferred embodiment of the present invention, the milling, and preferably wet milling of the getter material and the starting niobium oxide are milled to the extent that the two components have similar particle distribution sizes. For instance, the particle distribution sizes preferably of the two components are such that the D10, D50, and D90 for each component are within 25% of each other and more preferably within 20% of each other and even more preferably within 10% of each other. The advantage of having similar particle distribution sizes leads to an improved rate of forming the oxygen reduced niobium oxide. In other words, when the sizes of the two components are similar, the getter material more uniformly accepts oxygen from the starting niobium oxide and similarly, the starting niobium oxide more readily is reduced. Thus, the final product, which is the oxygen reduced niobium oxide, is more uniform and includes as part of the final product, the niobium getter material which has been transformed as well to the oxygen reduced niobium oxides. This reaction rate is also increased due to the shorter distance for the oxygen to defuse out of the starting niobium oxide and to defuse into the getter material. This shorter distance also minimizes oxygen gradients within the final product, resulting in a more stable product. By improving the reaction kinetics, the processing temperature for the reaction may be decreased to a temperature that is more favorable for the formation of preferred oxygen reduced niobium oxides, such as NbO.

In a preferred embodiment of the present invention, the milling, and more preferably, the wet milling of the getter material and the starting niobium oxide occur together. In more detail, the milling (e.g., wet milling) of the getter material and the starting niobium oxide can occur simultaneously wherein both materials are introduced in a mill, as described above, and uniformly mixed together in the mill for purposes of achieving a uniform mixture as well as uniform particle size. However, since the amount of time necessary to achieve the same particle size varies between the getter material and the starting niobium oxide, preferably, the getter material is introduced first and milled alone for a certain time, such as a particular targeted size of, for instance, from about 1 to about 10 microns. Then the starting niobium oxide is introduced into the same mill and the milling is continued with both components present, until a targeted size of both particles is obtained, which is preferably from about 1 micron to about 10 microns, and more preferably, from about 1 to about 5 microns. In a preferred embodiment, the getter material achieves a particle size of about 2 microns and the starting niobium oxide achieves a particle size of about 4 microns. In a preferred embodiment, the milling occurs in an Attritor mill such as a 1 S mill which is operated at about 350 rpms. When the milling is completed, the mixture can then be subjected to the heat treatment as described in the previous applications incorporated herein.

The milling of the getter material, the starting niobium oxide, and/or the final product can also occur sequentially by milling with varying ball diameters. This use of staged milling can be used as a step in and of itself or can be used in combination with one or more of the above-described steps. This preferred method dramatically reduces the time required to obtain a desired particle size and distribution. The milling of the getter material, for instance, can occur in stages in different mills or in the same mill. In the preferred embodiment, faster milling is achieved early in the process by using a large ball diameter to product diameter ratio. When the product population increases, the ball diameter should be reduced in order to increase the ratio of balls to product, and thereby increasing the chances of the product being hit and shattered. Preferably, the size of the getter material and/or the starting niobium oxide (hereinafter feedstock) can be as large as 1/10 of the size of the ball diameter. This feedstock-to-ball ratio can be used until the feedstock-to-ball ratio is from 1/1000 to about 1/500, more preferably, until the feedstock-to-ball ratio is about 1/200. The ball diameter can then be changed so that the ratio of feedstock-to-ball diameter is about 1/10. This process can be continued until the original feedstock reaches a size of from about 5 to about 1 microns and can further be used to make sub micron particles. The balls tend to reduce the larger particles faster than the smaller ones. Therefore, rather than using very small ball diameter balls for the second milling step, which would take more time and create a broad distribution, a ball diameter is sequentially selected that takes advantage of being relatively massive while still being numerous, and yet follow the 1/10 ratio of feedstock-to-ball diameter.

In the staged milling embodiment of the present invention, two or more stages of milling using increasingly smaller diameters are used. In other words, in the first initial milling stage, the diameter of the milling media is larger than the diameter of the milling media used in the second stage. Furthermore, if more than two stages are used, preferably each subsequent milling stage uses a milling media that has a diameter smaller than the previous milling stage. More than two milling stages can be used depending upon the desired particle size of the final product. For purposes of the present invention, at least two stages of milling accomplish the desired result, namely a product having a particle size of from about 1 micron to about 5 microns. Sub micron particles can be obtained by use of this technique.

Using the stage milling, the overall milling time can be reduced by at least 10% and more preferably can be reduced by at least 15% and even more preferably by at least 50% compared to milling having only one stage of milling using the same milling media.

In the preferred embodiment, in each milling stage, the ball diameter is smaller than the ball diameter of the previous milling stage. The above process permits a more uniform milling of the feedstock, since smaller diameter balls permit a more uniform milling. This stage milling can be applied to the milling of any of the component(s) used in the present invention. The advantage of using this preferred method of the present invention is that this method reduces the overall milling time to achieve the target size of from about 1 micron to about 5 microns. Additionally, the reduction of the milling time reduces the production costs and exposure time to contaminants. Moreover, to further reduce contamination, each mill and its grinding ball can be made of niobium metal or lined with niobium metal. Preferably, the milling process of this preferred method is a wet milling process. An example of a suitable ratio for a wet milling process is 800 grams of niobium powder to 300 ml of water. (e.g., 600 g for NbO and about 250 g $Nb_2O_5$) The remaining volume in the mill is taken up by milling media. Dry milling can be used in lieu of wet milling, and generally, the milling process takes place in an inert atmosphere.

For purposes of the present invention, any of the milling steps described in the present application can be conducted under heat, such as described in International Published PCT Patent Application No. WO 00/56486 incorporated in its entirety by reference herein. Also, other additives can be added during any milling step, such as a binder, lubricant, surfactant, dispersant, solvent, and the like.

With the present invention, a narrower particle distribution range can be achieved for the getter material, starting niobium oxide, and/or oxygen reduced niobium oxide. For instance, the particle size distribution range can be such that the D10 and/or D90 is within 25% of the D50 and more preferably is within 20% or 10% of the D50. Such a tighter particle distribution range leads to favorable properties especially with respect to improved electrical properties, such as in the anode containing the oxygen reduced niobium oxide. In addition, a tighter particle distribution range leads to a better quality control of the finished product since each batch of material preferably has more similar physical and electrical properties.

If not milled together, the milled niobium getter powder can then be mixed with the milled starting niobium oxide material. If already mixed, the mixed or blended getter powder and starting niobium oxide material, which is preferably $Nb_2O_5$ can then be subjected to an inert gas heat treatment. The temperature and the time of the heat treatment can depend on a variety of factors, such as the amount of reduction to the niobium oxide, the amount the getter material, and the type of getter material as well as the type of starting niobium oxide. Routine testing in view of the present application will permit one skilled in the art to readily control the times and the temperatures of the heat treatment in order to obtain the proper oxidized reduction of the niobium oxide.

The inert gas heat treatment preferably occurs in a hydrogen-containing atmosphere, and more preferably in a pure hydrogen atmosphere. Other gases can also be present with the hydrogen, such as inert gases, so long as the other gases do not react with the hydrogen. Furthermore, during the heat treatment process, a constant heat treatment temperature can be used during the entire heat-treating process or variations in the temperature or the temperature steps can be used.

Once the heat treatment is complete and the desired oxygen reduced niobium oxide is obtained, the powder can then be pressed into an anode using conventional methods of forming anodes from valve metals. In the present invention, the oxygen reduced niobium oxide has significantly improved flow properties as well as crush strength and further has low impurities which all lead to beneficial capacitor anode properties, such as an extremely low leakage.

In more detail, the crush strength of the oxygen reduced niobium oxide preferably has a ten fold increase compared to the oxygen reduced niobium oxides formed using the previous methods of making the oxygen reduced niobium oxides, such as those described in U.S. patent application Ser. No. 09/154,452.

The crush strength and other properties are preferably achieved by taking the oxygen reduced niobium oxide formed from the above-described preferred process of the present invention and combining it with a sufficient amount of binder in order to form the capacitor anode. Preferably, the amount of binder used is from about 1% to about 5% by weight based on the weight of the capacitor anode. Suitable binders include, but are not limited to, PEG and Q-Pak. Other suitable binders are described in one of the earlier referenced applications, which are incorporated in their entireties by reference herein.

The flow properties of the oxygen reduced niobium oxides of the present invention are preferably improved as well as the impurity levels of the oxygen reduced niobium oxides, as shown in the examples.

An additional embodiment of the present invention involves milling of the oxygen reduced niobium oxide, such as NbO. In more detail, after the heat treatment and formation of the oxygen reduced niobium oxides, the final product can then be milled, such as by wet milling, in order to achieve a more uniform particle size distribution. Preferably, the particle size can range from about 1 micron to about 10 microns and more preferably from about 1 micron to about 5 microns. The milling of the final product can occur in combination with the above-mentioned milling steps. However, if the milling of the starting niobium oxide and the niobium getter material occurs prior to the heat treatment, the milling of the final product can be avoided. If the starting niobium oxide is not milled but simply mixed with the niobium getter material, for instance, then it is preferred that the resulting oxygen reduced niobium oxides are milled afterwards once the final product is formed. As shown in the examples, this post-milling of the final product can lead to significantly improved crush strength properties.

Once the oxygen-reduced niobium oxides are formed, as indicated above, the particles can be mixed with a binder in the amounts indicated above and then optionally compacted. The particles, if desired, can then be crushed sufficiently to form a particle distribution of from about 100 microns to about 500 microns, and more preferably from about 100 microns to about 300 microns. These particles can then be pressed into anodes and sintered for anode production using conventional techniques known to those skilled in the art. As shown in the examples, the crush strength of the oxygen-reduced niobium powders of the present invention are significantly improved compared to previous oxygen reduced niobium oxides and further have significantly lower leakage.

While the above-described embodiments have been discussed using niobium as the preferred material, the present invention equally applies to other valve metal getter materials, other valve metal oxygen reduced materials, and other starting valve metal oxides, as described in U.S. Pat. No. 6,322,912 B1, which is incorporated in its entirety by reference herein.

The present invention will be further clarified by the following examples, which are intended to be exemplary of the present invention.

EXAMPLES

Example 1

According to the preferred embodiment of the invention, the beginning feedstock was a highly purified crushed niobium hydride screened to 40 mesh (420 microns). This feed material was milled in an Attritor mill to obtain the desired size reduction of microns. The mill itself was lined with Nb and was outfitted with Nb arms to eliminate contamination concerns. The milling was accomplished by stirring 3/16 inch Nb balls in water and then adding the 40 mesh Nb powder to create a slurry. The slurry was stirred for a short time (5 to 10 minutes) to quickly reduce the size of the feed to around 140 mesh (~100 micron). This material was drained from the mill and separated from the 3/16 inch milling media using a screen. 1/16" Nb media was placed in the mill and the slurry returned to the mill. The mill was then operated an additional 10–15 minutes with the smaller media to obtain the desired D50 of ~5 microns.

Example 2

To test the improvement in crush strength due to milling, a broadly distributed NbO powder sample was milled to reduce the average particle size and tighten the particle distribution. The following procedure was used:

A. Post Reaction Milling

A NbO sample (#8587-48) was wet milled in an 01HD Attritor mill with 1.5 mm Nb balls for approximately 8 minutes to de-agglomerate the powder. The mill was operated at 1000 RPM. Water was used with the powder to create the slurry for milling. Once milled, the slurry and milling media were dumped from the mill and separated via screening. The slurry was allowed to settle and the excess water was removed by decanting. The remaining cake was dried, crushed and screened and assigned the sample number of 8587-48-UP1.

Crush Evaluation

Representative anodes of the resulting powder were pressed at 3.0 and 3.5 g/cc press density (Dp). Results are shown below compared to the unmilled powder.

| | Unmilled | Unmilled | Milled | Milled |
|---|---|---|---|---|
| Sample | 8587-48 @ 3.0 Dp | 8587-48 @ 3.5 Dp | 8587-48-UP1 @ 3.0 Dp | 8587-48-UP1 @ 3.5 Dp |
| Average Crush (lbs) | 0.33 | 1.13 | 2.48 | 6.91 |
| | Pre-milled getter | | Pre-milled getter NbO milled | |

As shown in the above table, the milled NbO samples using Nb balls have much higher average crush weight.

Example 3

To test the rate of particle size reduction and particle size distribution due to changing the milling media diameter, coarse feed was introduced to the attritor mill with larger milling media for a short period and then remilled using smaller media. The response to milling with a single ball size versus changing ball diameters is shown in FIG. 1.

As shown in FIG. 1, in 10 minutes the staged milling process reduced the particle size from about 40 mesh to about 12 microns. The media was then replaced with smaller media and milling resumed to obtain an average particle size of just under 5 microns in about 35 minutes total. In contrast, to get the same particle size in the same time using a single ball diameter, the starting feedstock had to start at a much smaller size of ~13 microns made by earlier milling runs.

Example 4

Figure 2:
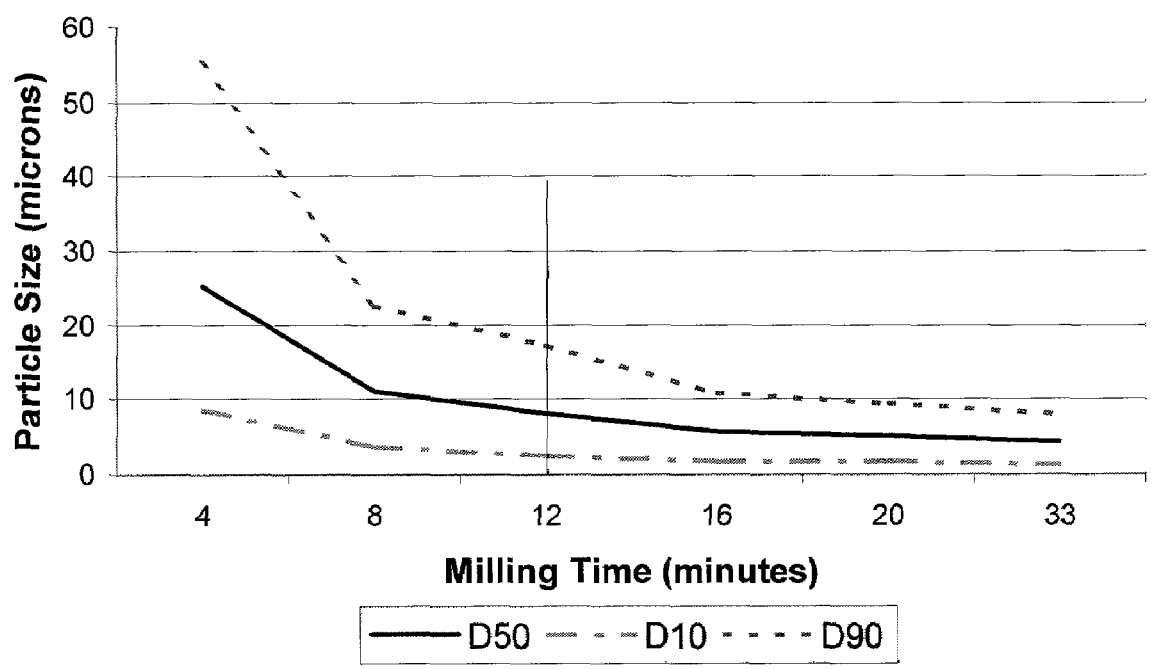

A starting material having a size of 40 mesh (420 microns) was introduced into the mill. A beginning ball diameter of 3/16" was selected to reduce the size of the starting material. A 3/16" diameter ball was selected because it is about 10 times as large as the starting material. As can be seen in FIG. 2, the milling rate reduces quickly when the starting material average size is reduced to about 13 microns. As such, the 3/16" diameter balls were replaced with 1/16" diameter balls to further reduce starting material size, when starting material size D90 reached about 1/200 of the ball diameter. The 1/16" diameter balls take advantage of being relatively massive while still being numerous. Thus, one can further reduce the starting material size in a very time efficient manner. D10 refers to the particular size at which 10% of the particles are smaller. D50 refers to the average particle size of the entire particle distribution and D90 is the particle size at which 90% of the particles are larger.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims and equivalents thereof.

What is claimed is:

1. A method of milling material comprising milling said material with a first milling media having a first size, then replacing said first milling media with a second milling media having a size smaller than said first size, and then milling said material with said second milling media, wherein said material comprises a getter material, a starting niobium oxide, an oxygen reduced niobium oxide, or combinations thereof.

2. The method of claim 1, wherein said first milling media and said second milling media are first milling balls having a first ball diameter and second milling balls having a second ball diameter, respectively.

3. The method of claim 2, wherein said material initially is no smaller than about 1/10 of said first ball diameter.

4. The method of claim 3, wherein said first milling balls are replaced by said second milling balls when said material is from about 1/100 to about 1/1000 size of said first ball diameter.

5. The method of claim 4, wherein said second ball diameter is less than about 10 times said size of said material when said first milling balls are replaced by said second milling balls.

6. The method of claim 2, wherein said second ball diameter is less than about 10 times said size of said material when said first milling balls are replaced by said second milling balls.

7. The method of claim 1, further comprising at least one additional milling step using milling media wherein the size of the milling media has an increasingly smaller size compared to the most previous milling step.

8. The method of claim 1, wherein said getter material is first introduced and is milled for a predetermined time and then said starting niobium oxide is introduced and said getter material and said niobium oxide are milled together.

9. The method of claim 8, wherein said starting niobium oxide is introduced in to said mill after the particle size of said getter material is from about 1 to about 10 microns.

10. A method of milling material comprising milling in a mill said material with a first milling media having a first size, then replacing said first milling media with a second milling media having a size smaller than said first size, and then milling said material with said second milling media, wherein said milling results in a particle size of 5 microns or less for the material wherein said material comprises niobium, niobium hydride, niobium pentoxide, an oxygen reduced niobium oxide, or combinations thereof.

11. The method of claim 10, wherein the mill has surfaces and said surfaces of the mill that come in contact with said material comprise niobium or alloy thereof, an oxide thereof, a nitride thereof, or niobium with at least one dopant.

12. The method of claim 10, wherein said first and second milling media are first milling balls and second milling balls, respectively, which are coated with niobium or are completely made of niobium.

13. The method of claim 10, wherein said material is present with at least one binder, dispersant, solvent, surfactant, lubricant, or combinations thereof.

14. A method of milling material comprising wet milling niobium or niobium hydride with a first milling media having a first size, then replacing said first milling media with a second milling media having a size smaller than said first size, and then milling said niobium or niobium hydride with said second milling media to form a milled niobium or niobium hydride and then co-milling said milled niobium or niobium hydride or combinations thereof with niobium pentoxide wherein said niobium pentoxide and said niobium or said niobium hydride or combinations thereof have a particle size of 5 microns or less after said co-milling.

15. The method of claim 14, wherein said material is present with at least one binder, dispersant, solvent, surfactant, lubricant, or combinations thereof.

16. The method of claim 14, wherein said milling occurs in a mill having surfaces that come in contact with said material comprise niobium or alloy thereof, an oxide thereof, a nitride thereof, or niobium with at least one dopant.

17. The method of claim 14, wherein said niobium or niobium hydride prior to said co-milling is dry.

\* \* \* \* \*